UNITED STATES PATENT OFFICE.

ISAAC COOPER, OF FORT WORTH, TEXAS.

STOMACH-BITTERS.

SPECIFICATION forming part of Letters Patent No. 365,242, dated June 21, 1887.

Application filed August 4, 1886. Serial No. 209,998. (No specimens.)

*To all whom it may concern:*

Be it known that I, ISAAC COOPER, a citizen of the United States, residing at Fort Worth, in the county of Tarrant and State of Texas, have invented certain new and useful Improvements in Stomach-Bitters; and I do hereby declare that the following is a full, clear, and exact description of the same.

The present invention has relation to a medical compound to be used as stomach-bitters for promoting and strengthening the appetite and the general system; and it consists in the combination of the different ingredients in about the proportions hereinafter described.

To prepare one gallon of the bitters, take of dogwood-bark, four (4) ounces; cherrywood-bark, four (4) ounces; rhubarb, one (1) ounce; cardamom seed, one (1) ounce. The above ingredients in a pulverized condition are placed in one (1) gallon of spirits (98 proof) and allowed to stand about twenty-four hours, or a sufficient time to have the entire strength of the ingredients extracted, after which the whole is strained, when it is ready for use.

As an appetizer or tonic, one-half wine-glassful is taken three times a day before meals.

I am aware that it is common to combine rhubarb and alcohol with aloes or gentian and cardamom-seeds, and do not claim such as of my invention, but limit myself to my particular mixture, attaching importance to the presence of the dogwood and cherrywood bark, which combined with the other ingredients named produces an excellent tonic but slightly laxative in its properties, the dogwood and cherry bark being very beneficial in calming irritation and diminishing nervous excitability, and thus being very efficient in nervous and intermittent fevers.

Having now fully described my invention, what I claim as new, and desire to secure by Letters Patent, is—

The herein-described compound to form a stomach-bitters, consisting of dogwood-bark, cherrywood-bark, cardamom-seed, rhubarb, and spirits, in about the proportions herein specified.

In testimony that I claim the above I have hereunto subscribed my name in the presence of two witnesses.

ISAAC COOPER.

Witnesses:
 JOHN G. CAMPBELL,
 CLAIB KYLE.